United States Patent

[11] 3,593,105

| | | | |
|---|---|---|---|
| [72] | Inventor | Paul D. Brohaugh New Berlin, Wis. | |
| [21] | Appl. No. | 854,881 | |
| [22] | Filed | Sept. 3, 1969 | |
| [45] | Patented | July 13, 1971 | |
| [73] | Assignee | The Louis Allis Company | |

[54] PHASE SEQUENCE INSENSITIVE FIRING CIRCUIT
8 Claims, 9 Drawing Figs.

[52] U.S. Cl. .................................................. 321/5, 318/302, 321/40, 321/47
[51] Int. Cl. .................................................. H02m 1/08, H02p 5/06
[50] Field of Search .................................................. 321/5, 38, 40, 41, 47, 318/138, 302

[56] References Cited
UNITED STATES PATENTS

| | | | |
|---|---|---|---|
| 2,141,922 | 12/1938 | Lord | 321/40 |
| 3,371,261 | 2/1968 | Hull et al. | 321/5 |
| 3,399,337 | 8/1968 | Stone | 321/5 |
| RE26,708 | 11/1969 | Spink | 321/47 X |
| 3,456,176 | 7/1969 | Wilkerson | 318/302 |

*Primary Examiner*—William H. Beha, Jr.
*Attorneys*—Alfred B. Levine, Alan C. Rose and Daniel D. Fetterley ABSTRACT: A firing circuit for a phase controlled rectifier system employs the line to line phase voltage to be conducted by a pair of the thyristors of the phase controlled rectifier to develop the firing wave for controlling the firing of the thyristors. The line to line phase voltage is phase shifted a constant amount to produce the appropriate firing wave regardless of the phase sequence or order of connection of the source to the phase controlled rectifier system. Coupling, as by an OR gate, between firing pulse generators for thyristors of a pair, insures that whichever of the two is controlled to fire first because of the sequence of the phases of the source, the firing pulse is also applied to the other thyristor of the pair to cause it to fire.

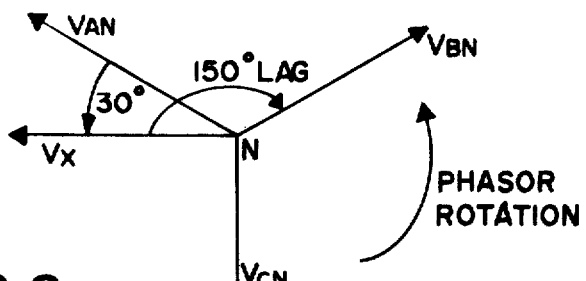
FIG. 2  ABC SEQUENCE
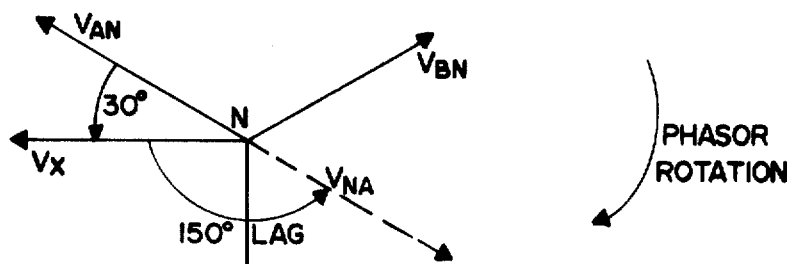
FIG. 3  CBA SEQUENCE
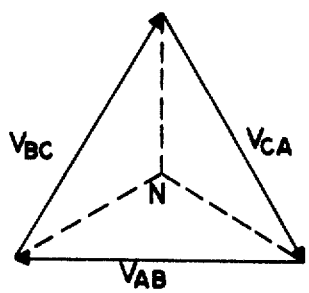
FIG. 4
INVENTOR.
PAUL D. BROHAUGH

INVENTOR.
PAUL D. BROHAUGH 3,593,105

PHASE SEQUENCE INSENSITIVE FIRING CIRCUIT

BACKGROUND OF THE INVENTION

This invention relates to firing circuits for phase controlled rectifiers. More particularly, it relates to a firing circuit which insures phase sequence insensitive firing of a multiphase phase controlled rectifier.

Many multiphase power conversion and drive systems are sensitive to the phase sequence of the multiphase source. The normal solution to alleviate malfunction due to improper connection of the source to the drive system or due to reverse phase rotation from the power source is to detect these abnormal sequences and either shut down the system or light a trouble light so that corrective action can be taken. Such detectors and the need for attendance when this malady arises have proved to be less than satisfactory solution to the problem. It is accordingly an object of the present invention to provide a firing circuit that is insensitive to the phase sequence of the source or the sequence presented to the drive system due to reversal of the connections of the source to the system.

It is another object of the invention to provide a firing circuit for a phase controlled rectifier which insures line to line phase sequence firing of the phase controlled rectifier without detection or recognition of the phase sequence of the source.

These and other objects are realized in a phase controlled rectifier system for applying full wave rectified multiphase voltage to a load in which phase sequence insensitivity is realized in the firing circuit for the thyristors of the phase controlled rectifier by the utilization of the line to line phase voltage to be conducted by a pair of the thyristors to form the firing wave to control the time of firing of these thyristors. The line to line phase voltage to be conducted is applied to a phase lag network which shifts the phase of the voltage so that the beginning of the negative to positive half-cycle of the shifted wave coincides with the point at which the line to line phase voltage becomes more positive than the preceding line to line phase voltage The firing wave produced from the phase shifting of the voltage to be conducted is compared with a DC voltage level which is the difference between the actual voltage being applied to the load and the commanded voltage level. When the DC level of this error voltage is equal in value to the level of the firing wave, a pulse generator produces a pulse at that point in time to fire the corresponding thyristor. This firing pulse is also coupled to the other of the pair of thyristors needed to conduct line to line current. For a given phase sequence (an ABC sequence for a three phase source), the thyristor of the pair which is fired by a coupled pulse was previously conducting as one of the two thyristors conducting the preceding line to line phase voltage. The coupling between pulse generators of pairs of thyristors insures that the firing pulse from one or the other of the two thyristors depending upon the phase sequence will always be available to fire the pair of thyristors.

BRIEF DESCRIPTION OF THE DRAWINGS

The method and apparatus for phase sequence insensitive firing will become better understood from the detailed description of a particular embodiment of the invention as shown in the drawings in which:

FIG. 2 is a phasor diagram of line to neutral voltages useful in understanding the principles of the present invention;

FIG. 3 is a phasor diagram of line to neutral voltages useful in understanding the principles of the present invention;

FIG. 4 is a phasor diagram of three phase line to line voltages;

DETAILED DESCRIPTION OF THE DRAWINGS

Figure 1:
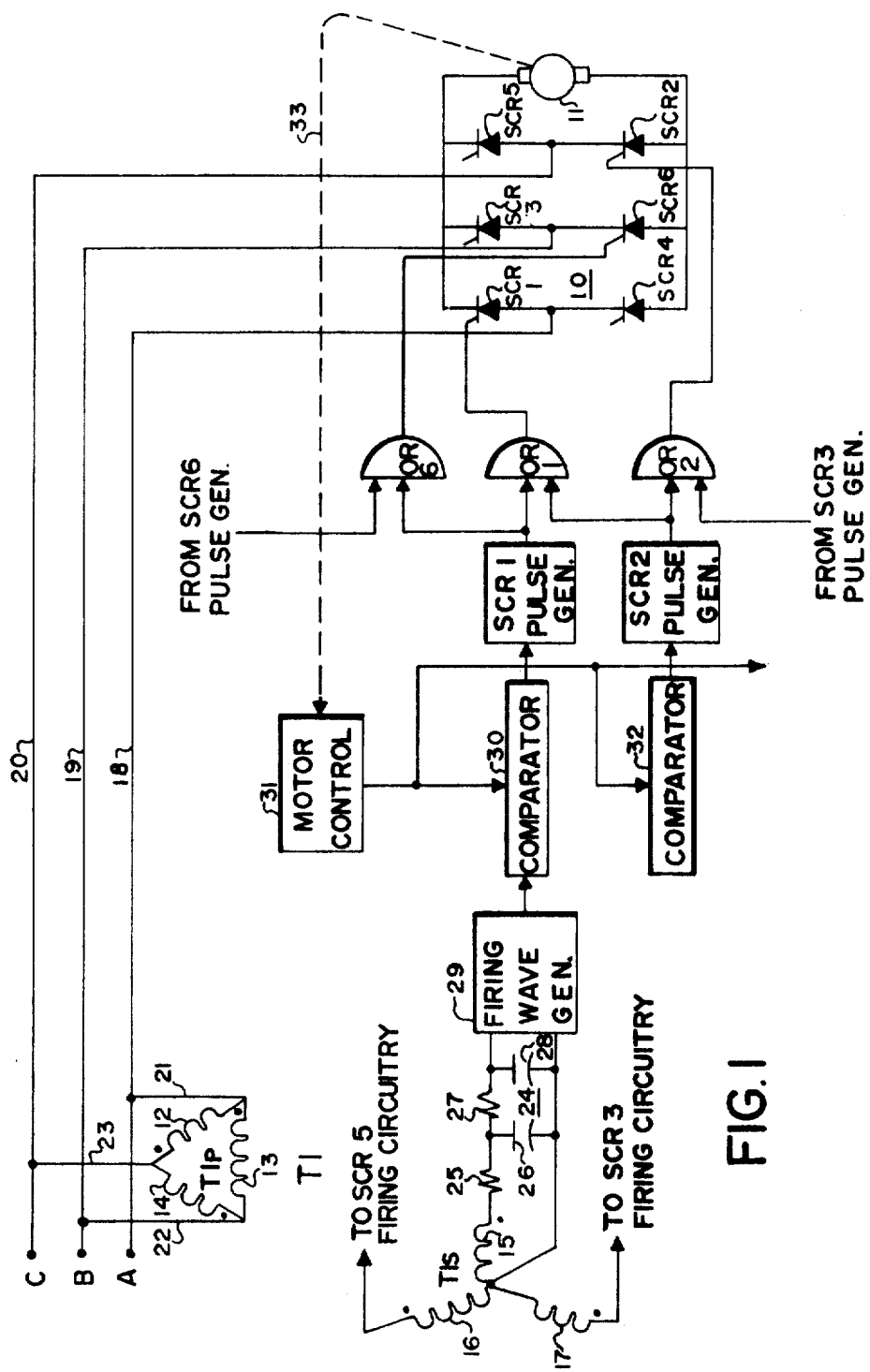
FIG. 1 is a block and schematic diagram of a phase controlled rectifier system in accordance with the present invention.

Prior to discussing the circuitry shown in FIG. 1 to achieve phase sequence insensitive firing for thyristors of a phase controlled rectifier, reference will be had to FIGS. 2, 3, 4, 5 and 6 to illustrate the problems presented and the method of solution to achieve phase insensitive firing. Referring at the outset only to the phase controlled rectifier 10 shown in FIG. 1, it is noted that phase A of the source is connected to SCR1 and SCR4, phase B is connected to SCR3 and SCR6 and phase C is connected to SCR5 and SCR2. For this connection, and assuming ABC phase sequence rotation of the generating source, the SCR's in the phase controlled rectifier must conduct in the order of their numbering to provide continuous regulated power to the load. It is noted that SCR1 must conduct when the A-B and A-C line to line voltages are positive. In order for current to have a complete path between the load and source, SCR2 must also conduct during the A-C line to line voltage interval and SCR6 must conduct during the A-B line to line voltage interval. To insure that two SCR's are conducting during each line to line phase interval of the source, coupled double pulse firing is employed. Coupled double pulse firing means that the firing pulse to fire SCR1 is coupled to also fire SCR2. The firing pulse for SCR1 could be coupled to fire SCR2 or SCR6, i.e., either coupling to a lesser numbered or coupling to a higher numbered successive SCR may be employed. The two alternative coupling schemes are shown in Table I below. Once the coupling logic is established, it cannot be changed for different phase sequences without employing a phase sequence detector to control the selection of the logic to be employed and this is the very circuitry which the present invention eliminates.

For the purposes of the discussion which follows, it will be assumed that the pulse from SCR1 is coupled to fire SCR6, the pulse from SCR2 is coupled to fire SCR1, the pulse from SCR3 is coupled to fire SCR2, etc., i.e., lower numbered coupling, as illustrated at the left in Table I is employed.

TABLE I

| Lower Numbered Coupling | | | | | | Higher Numbered Coupling | | | | | |
|---|---|---|---|---|---|---|---|---|---|---|---|
| 1 | 2 | 3 | 4 | 5 | 6 | 1 | 2 | 3 | 4 | 5 | 6 |
| ↓ | ↓ | ↓ | ↓ | ↓ | ↓ | ↓ | ↓ | ↓ | ↓ | ↓ | ↓ |
| 6 | 1 | 2 | 3 | 4 | 5 | 2 | 3 | 4 | 5 | 6 | 1 |

Figure 5:
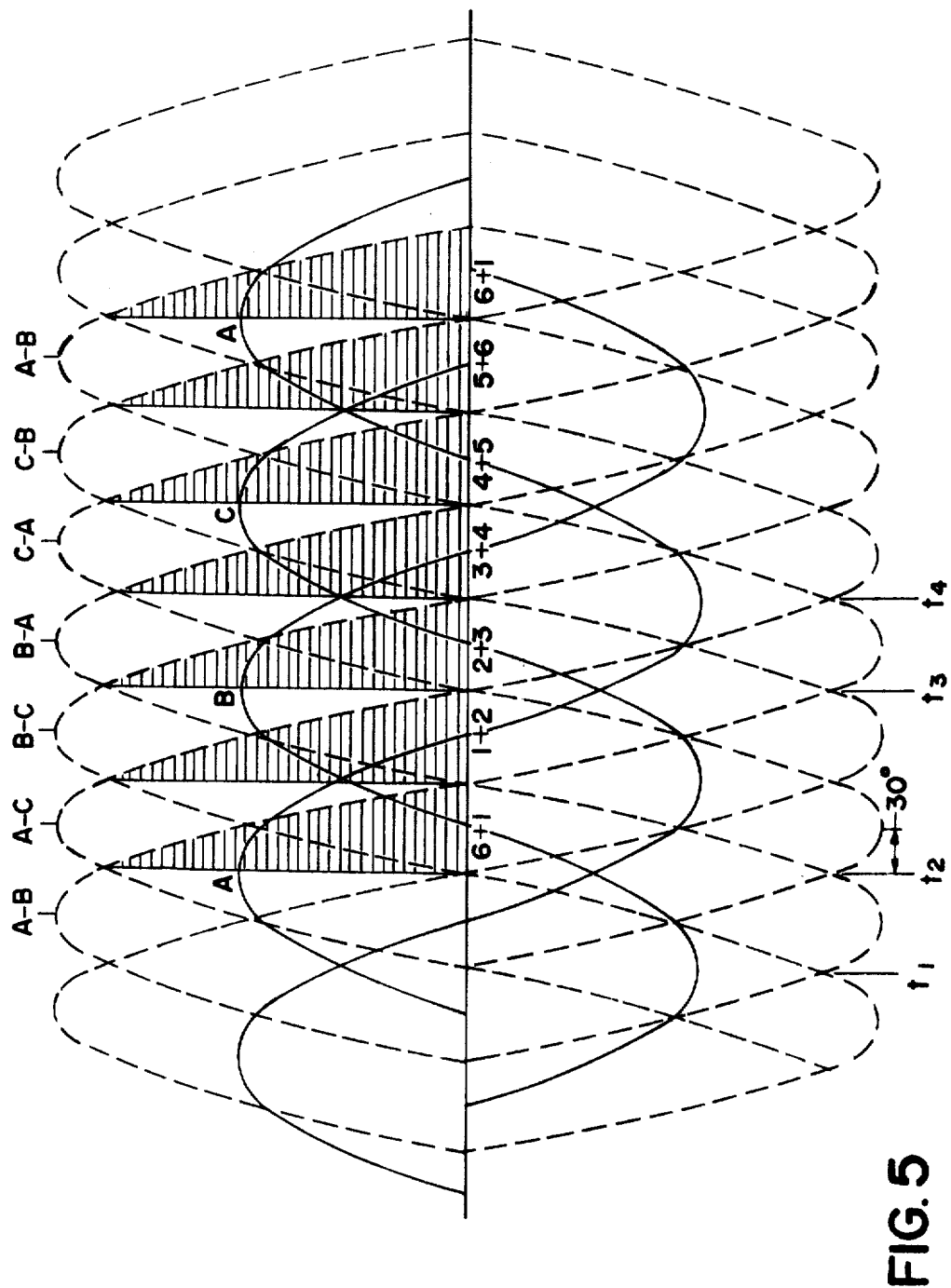
FIG. 5 is a plot of three phase line to line and line to neutral voltages for an ABC phase sequence.

Referring now to FIG. 5, the firing conditions for firing one of the SCR's, SCR1, for example, can be observed. Since the line to line voltage A-B precedes the A-C voltage in the ABC sequence, SCR's 1 and 6 must conduct prior to SCR's 1 and 2. It is noted that the line to line phase voltage A-B becomes more positive than the previous line to line voltage C-B at time $t_1$. This is the earliest point at which SCR's 1 and 6 can be safely fired. Since it is desired to have the ability to conduct during both the rectifying and inverting mode of operation of the motor drive system shown in FIG. 1, provision must be made to fire SCR's 1 and 6 for 180° of the A-B line to line voltage. Thus, the firing wave must have its minimum and maximum points in coincidence with points $t_1$ and $t_3$ on the plot of FIG. 5. It is noted that the phase B line to neutral voltage has its minimum point at time $t_1$ and its maximum point 180° later at time $t_3$.

Refer now to FIG. 2, which is a phasor diagram showing the relationship between the A, B and C line to neutral voltages of the three phase source with the sense of rotation for the ABC sequence indicated. Since it is desired to have the B to neutral voltage serve as the firing wave, this voltage could be obtained for example by lagging the $V_{AN}$ voltage 120°.

From FIG 3, it is noted that with a CBA phase sequence, the phasor rotation is in the opposite direction and a 120° phase lag from the $V_{AN}$ vector would coincide with the $V_{CN}$ vector. Here a possible problem should be recognized. If $V_{CN}$ is the proper wave for SCR's 1 and 6 during the A-B line to line voltage in a CBA phase sequence, then by phase shifting the $V_{AN}$ voltage 120° the proper firing wave is obtained for either an ABC or a CBA phase sequence. However, if $V_{CN}$ is not the proper wave, only ABC sequence operation is possible when the firing wave is derived from the $V_{AN}$ voltage.

Figure 6:
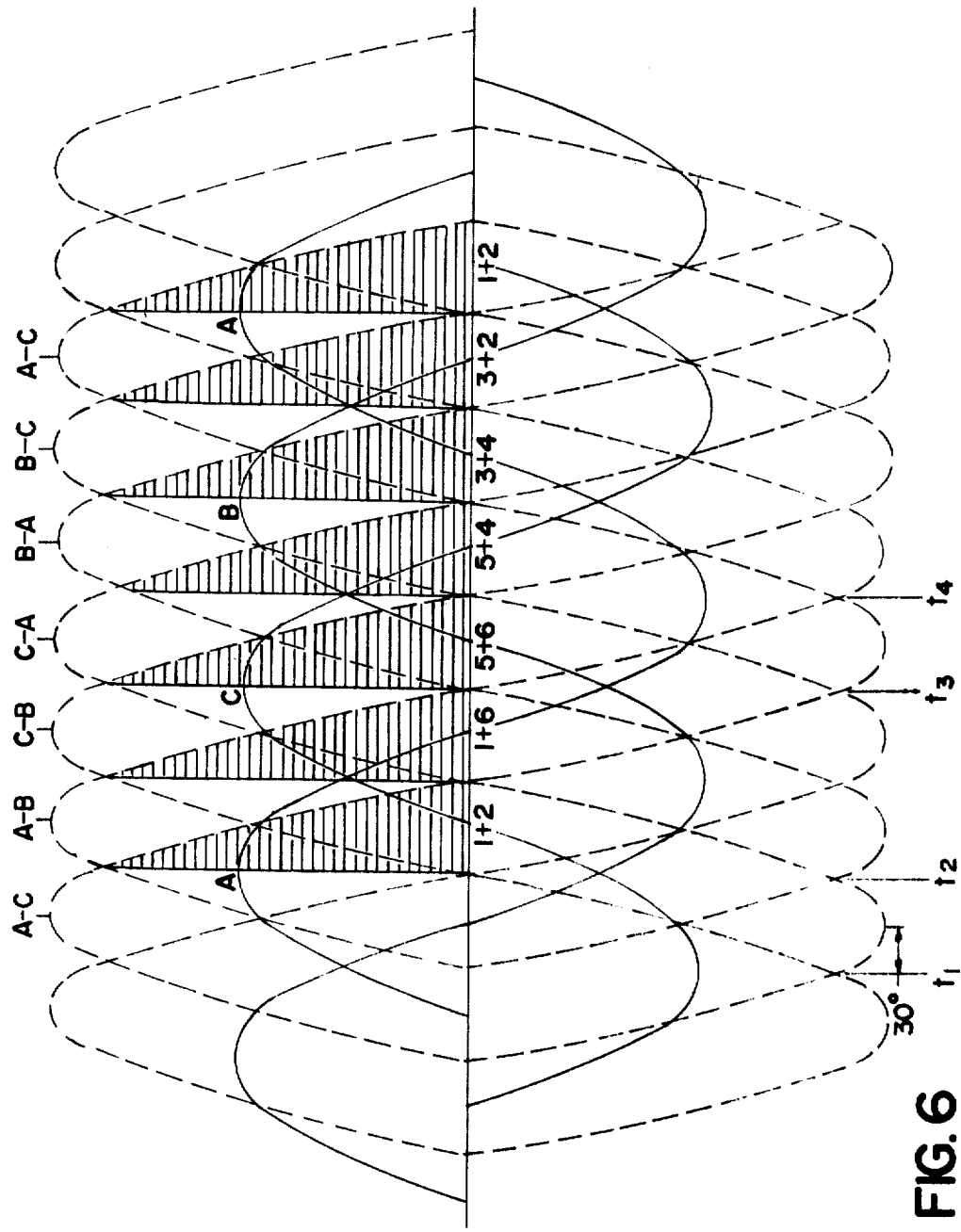
FIG. 6 is a plot of line to line and line to neutral voltages for a CBA phase sequence.

The answer to this problem is found by reference to FIG. 6. It is noted that the firing wave for the A-B line to line voltage must begin at time $t_2$ and extend to time $t_4$. The line to neutral voltage which most closely corresponds to this time period is the phase A voltage which has its maximum at time $t_2$ and its minimum at time $t_4$. Thus, the appropriate firing wave is the -A line to neutral voltage, i.e., $V_{NA}$ as shown in FIG. 3. The problem can now be defined as, "What voltage when phase shifted to obtain the $V_{BN}$ firing wave for an ABC sequence will provide a $V_{NA}$ firing wave for a CBA phase sequence?" The other significant question which must be answered is, "Is there a unique voltage which will produce the necessary firing waves for ABC and CBA phase sequences?"

It is assumed that the answer to the second question is that there is a unique voltage that will produce the appropriate ABC and CBA firing waves for a given line to line phase voltage. This voltage can be called $V_X$. $V_X$ is shown in FIGS. 2 and 3 as a compromise, being further away from $V_{BN}$ and closer to $V_{NA}$, which with a larger phase shift than the originally contemplated 120° produces the desired $V_{BN}$ and $V_{NA}$ firing waves. A clue to the placement of $V_X$ is obtained from observing voltage vector $V_{AB}$ shown in FIG. 4. The common link between firing SCR's 1 and 6 during an ABC phase sequence and a CBA phase sequence is that in each case, the line to line voltage AB is the voltage that is desired to be conducted. Accordingly, when $V_X$ was selected to be in alignment with $V_{AB}$, the unique voltage for deriving the different firing waves for each of the phase sequences was obtained.

FIG. 1 shown appropriate circuitry for obtaining phase sequence insensitive firing of the thyristors in a phase controlled rectifier in accordance with the method set forth above. FIG. 1 shows the A, B and C phases of a multiphase source of voltage being applied to a motor 11 through a phase controlled rectifier 10. The three phases of the source are connected to the phase controlled rectifier by the leads 18, 19 and 20. The multiphase source is also connected to the firing circuit for the thyristors of the phase controlled rectifier by a transformer T1. Leads 21, 22 and 23 are shown connecting the primary T1P of transformer T1 to the multiphase source. Transformer T1 has a delta primary winding consisting of winding 12 for the A-C line to line voltage, winding 13 for the A-B line to line voltage and winding 14 for the B-C line to line voltage. Transformer T1 has a wye secondary winding T1s comprising windings 15, 16 and 17. The circuitry that is shown in FIG. 1 is complete for the firing of SCR1 and indicative of the duplicate circuitry required for the firing of the remainder of the SCR's.

Secondary winding 15 which carries the voltage $V_{AB}$, the appropriate $V_X$ voltage for SCR1, is connected to the phase shift circuit 24. This is the same A-B line to line voltage to be conducted by SCR1. Phase shift circuit 24, made up of resistors 25 and 27 and capacitors 26 and 28, provides the appropriate phase shift to obtain the desired firing waves for SCR1. This circuit and its duplicates provides for each of the other five SCR's a phase lag of 150°.

Although the line to line voltage phase shifted by circuit 24 constitutes the firing wave for controlling the firing of SCR1, and as such could be directly applied to comparator 30, this firing wave is shown applied to a firing wave generator 29 where it may be amplified and/or adjusted in level. The firing wave generator accordingly could consist of an amplifier or a circuit to modify the wave shape of the firing wave such as by causing the end points of the pertinent half-cycle of the wave applied thereto to be accentuated. A preferable circuit for this purpose is described and claimed in the corending application Ser. No. 854,429 of Charles E. Rettig, filed Sept. 2, 1969 by the assignee of the present application.

The firing wave output from generator 29 is applied to a comparator 30 which compares the firing wave with the DC command from the motor control circuit 31. The output of the motor control circuit is the error voltage derived from the difference between the actual parameter being controlled (such as the voltage across the load 11 which is indicated being applied to the motor control by dashed line 33) and a reference or command signal (such as a voltage indicative of the desired voltage to be applied to the load). This reference or command voltage may be generated inside the motor control circuit, as indicated, or can be supplied from an external source. The motor control circuit preferably consists of a differential amplifier having the reference voltage applied to one input terminal thereof and the load voltage applied to the other input terminal thereof. It could also consist of a summing network algebraically summing the two voltages and an amplifier to amplify the difference obtained. Where the load is a motor, the voltage from the load can be generated by a DC tachometer coupled to the shaft of motor 11 or can be derived from the output of the phase controlled rectifier 10.

Comparator 30 may also consist of a differential amplifier responding to the firing wave at one input and the control voltage at the other input. When both of these voltages are equal, the comparator will produce an output which is applied to the SCR1 pulse generator. The pulse generator may be of any variety known in the art such as a unijunction transistor pulsing circuit or a multivibrator.

Figure 9:
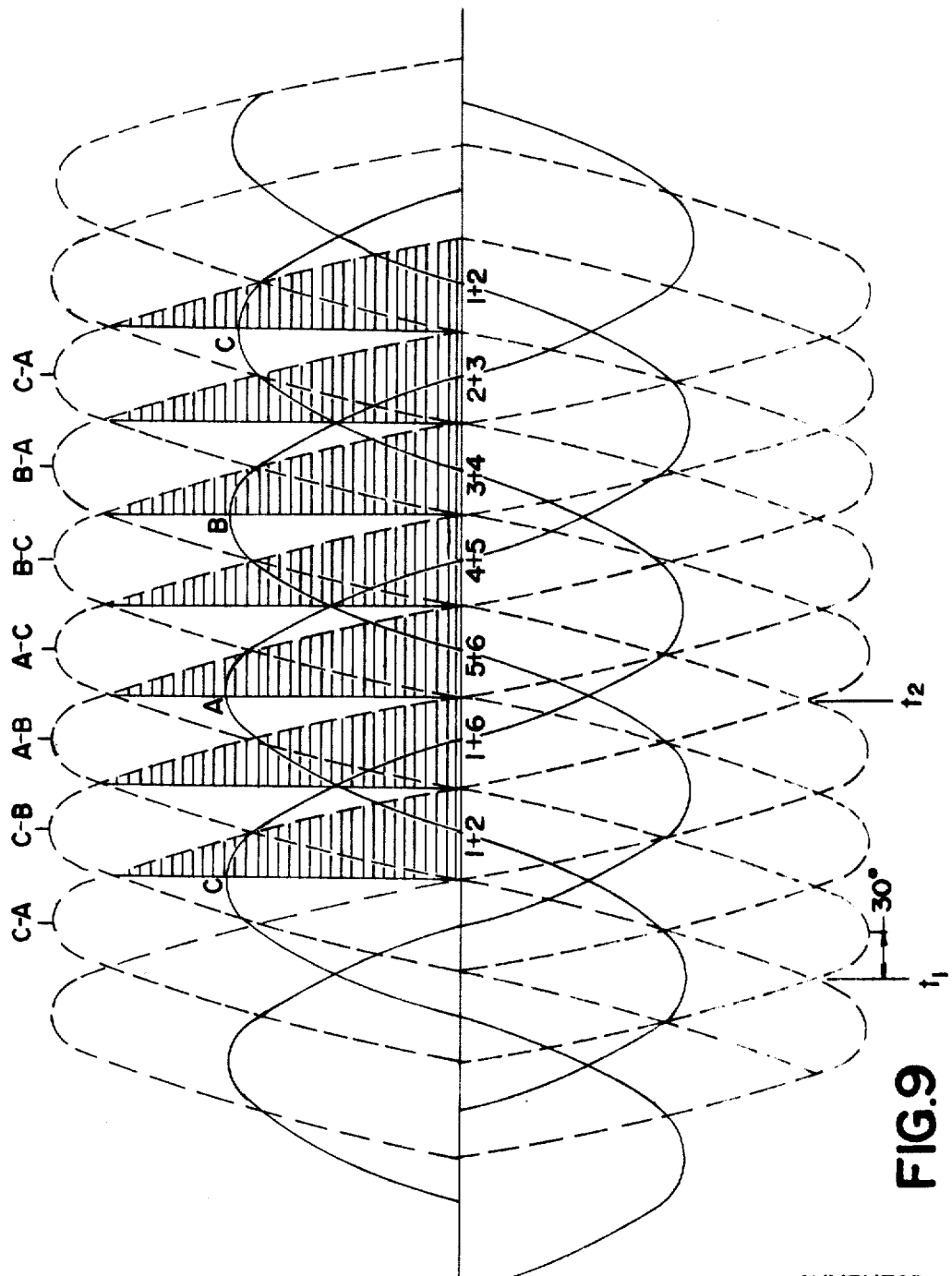

With brief reference to FIG. 5 again and observing the A-B line to line voltage wave form from time $t_1$ to time $t_2$ and the phase B firing wave during that time period, it is noted that if the DC control voltage (from motor control 31) level is low and intersects the firing wave early in the half-cycle, i.e., close to time $t_1$ then the SCR will be fired early in the half-cycle to conduct a large portion of the A-B voltage. As the DC voltage level rises and intersects the firing wave later in the half cycle, lesser amounts of the line to line voltage will be applied to the load. In FIGS. 5, 6 and 9 the intersection of the control voltage and firing waves appears 60° after the beginning of the time the line to line phase voltage to be conducted becomes more positive than the preceding line to line voltage. The shaded portion of the line to line voltages in these figures indicates the period of conduction. Although each of the FIGS. 5, 6 and 9 indicate SCR conduction during the positive portions of the line to line voltages resulting in rectifying action, operation in the inverting mode to provide regeneration of the motor's power is readily achieved under control of the firing wave which extends into the negative voltage region.

FIG. 1 shows that the pulse generated by SCR1 pulse generator is applied to SCR1 through OR gate 1 and is also applied to OR gate 6 which is connected to SCR6. FIG. 1 also shows that the pulse generated by SCR2 pulse generator is connected to OR gate 1 to also fire SCR1. This is necessary because SCR1 must conduct with SCR's 6 and 2 to conduct capable A-B and A-C line to line voltages, respectively. It can be noted with reference to FIG. 6 that for the CBA sequence that the A-C line to line voltage precedes the A-B line to line voltage so that the first firing of SCR1 is occasioned by the pulse from the SCR2 pulse generator. This is because the A-C voltage is applied to the phase shift circuit for SCR2 via transformer winding 16 which also couples the C-A voltage to the SCR5 firing circuit as indicated. Thus, the OR gate coupling insures that the proper SCR's are conducting regardless of the sequence of the line to line voltages to be conducted.

Figure 7:
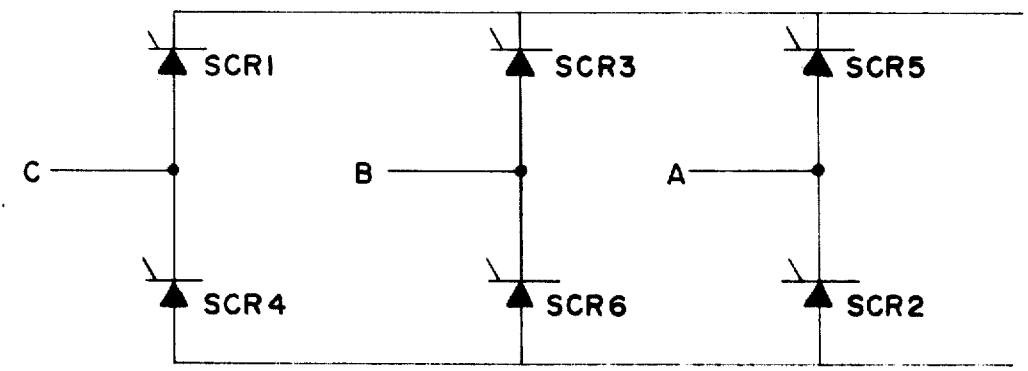
FIG. 7 is a schematic diagram of a phase controlled rectifier wherein the source has been connected in reverse of that shown in FIG. 1.
Figure 8:
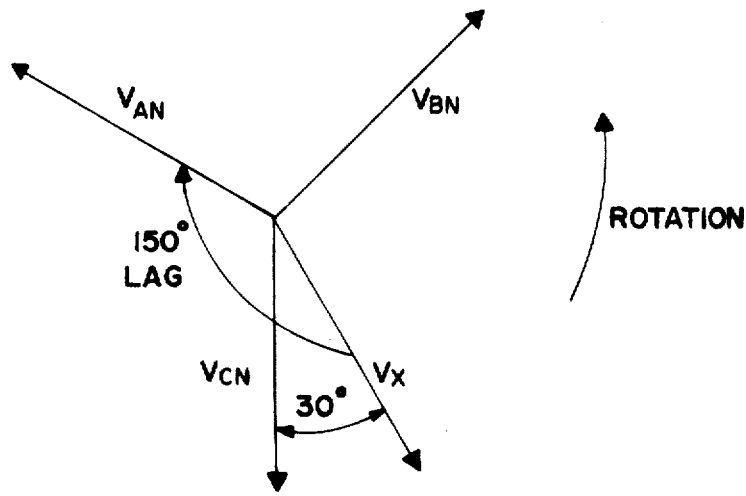
FIG. 8 is a phasor diagram helpful in understanding the operation of the phase controlled rectifier shown in FIG. 7; and, FIG. 9 is a plot of three phase line to line and line to neutral voltages to aid in the understanding of the voltage source connection shown in FIG. 7.

In FIG. 7 the phase controlled rectifier 10 is shown again with the phases of the multiphase source connected in reverse order to the connection shown in FIG. 1. Now phase C is connected to SCR1 and SCR4 and phase A is connected to SCR5 and SCR2. FIGS. 8 and 9 show that the fixed phase shift of phase shift circuit 24 and the OR gate coupling between the SCR's permit the SCR's to be successively fired and capable of accommodating this reverse connection of the multiphase source to the system. It must be noted that the same connection at the phase controlled rectifier 10 appears at the input of the system as the leads 18, 19 and 20 are internal to the system and remain fixed.

For the connection shown in FIG. 7, SCR1 must conduct during the C–A and C–B line to line voltages. From FIG. 9 it can be seen that the C–A line to line voltage appears before the C–B line to line voltage. During the C–A voltage SCR's 1 and 2 are to conduct and thus SCR1 will be first fired by the coupling from the SCR2 pulse generator as was experienced during the CBA sequence described above with regard to FIG. 1. This is further illustrated by FIG. 9 which shows that the A to neutral voltage is the firing wave for the C–A line to line voltage. Referring back to FIG. 1, it can be seen that transformer T1 secondary winding 16 couples the A–C line to line voltage to SCR5 firing circuitry so that the inverse or C–A line to line voltage is coupled to the SCR2 firing circuitry. (For the purpose of FIG. 7, SCR1 and SCR4 should be mentally interchanged with SCR2 and SCR5 when referring to the FIG. 1 showing of transformer T1.)

Referring now to FIG. 8, the $V_x$ voltage which is to be phase shifted is shown to be in line with the $V_{CA}$ line to line voltage as indicated by FIG. 4. The 150° phase lag with respect to the sense of rotation shown produces the desired $V_{AN}$ firing wave.

It should be noted that the method described for phase sequence insensitive firing produces a firing wave that is a line to neutral voltage directly related to the line to line voltage to be conducted by the thyristors whose firing is being controlled.

Departures can be made from the preferred embodiment of the invention described without departing from the spirit thereof. For example, transformer T1 could be employed to derive the firing wave by selecting the opposite polarity winding (compared to above discussion) of the wye secondary, and using a 30° phase lead circuit. However, such a connection would not provide the filtering provided by the RC phase lag network shown. Without the removal of the harmonics caused by the firing of the SCR's, the firing wave would be erratic and would not provide the precise control required. Thus, the phase shift circuit employed provides both phase shifting and a smooth firing wave. In addition, as has been mentioned, while the invention has been described with reference to coupling from higher numbered pulse generators to lower numbered pulse generators via the OR gates, the opposite connection can be employed with equivalent results.

I claim:

1. In a phase controlled rectifier system having complementary pairs of thyristors for supplying rectified line to line phase voltages to a load from a multiphase voltage source, a method of firing the thyristors of the phase controlled rectifier to insure ordered successive conduction for each line to line phase voltage regardless of the phase sequence of the multiphase source or the order of the connection of the multiphase source to the phase controlled rectifier system, comprising:

electrically phase shifting the line to line phase voltage to be conducted by each complementary pair of thyristors to obtain a sinusoidal firing wave the phase shift of which, with respect to the line to line phase voltage to be conducted, remains the same regardless of the phase sequence or connection of the multiphase source;

generating a firing pulse for one thyristor of each complementary pair at a time during the line to line voltage cycle as controlled by the corresponding firing wave; and coupling the firing pulse for the one thyristor to the other thyristor of the complementary pair.

2. A method as recited in claim 1 wherein the line to line voltage to be conducted is phase shifted so that the negative to positive half-cycle of the sinusoidal firing wave begins at the time the line to line phase voltage to be conducted becomes more positive than the preceding line to line phase voltage.

3. A method as recited in claim 1 wherein the line to line voltage to be conducted is phase shifted 150 electrical degrees lagging.

4. In a phase controlled rectifier system for supplying a full wave rectified voltage to a load from a multiphase source including the phase controlled rectifier having a complementary pair of thyristors to conduct each of the line to line phase voltages of said multiphase source, wherein the firing of the thyristors is controlled by a control direct voltage and a sinusoidal firing wave, a firing circuit to insure firing of each of said pairs of thyristors for each successive line to line phase voltage regardless of the phase sequence of the multiphase source or the order of the connection of the multiphase source to the phase controlled rectifier system, comprising:

electrical phase shift means coupled to the source to phase shift the line to line voltage to be conducted by a given pair of thyristors a fixed predetermined amount regardless of the phase sequence or connection of the multiphase source to obtain the sinusoidal firing wave;

comparing means responsive to the sinusoidal firing wave and the control voltage to produce an output signal when the firing wave becomes equal in value to the control voltage;

pulse generating means producing a firing pulse for one of the thyristors of said given pair in response to the output signal from said comparing means; and coupling means coupling the firing pulse to the other thyristor of said given pair.

5. A firing circuit as recited in claim 4 wherein said electrical phase shift means comprises resistor-capacitor means for providing a lagging phase shift 150° the line to line phase voltage.

6. A firing circuit as recited in claim 5 wherein said electrical phase shift means phase shifts the line to line phase voltage 150° electrical degrees lagging.

7. A firing circuit as recited in claim 4 wherein for a given phase sequence the other of said given pair of thyristors conducted the preceding line to line phase voltage and is refired by the coupled firing pulse.

8. A firing circuit as recited in claim 4 wherein said coupling means is an OR gate.

UNITED STATES PATENT OFFICE
CERTIFICATE OF CORRECTION

Patent No. 3593105　　　　　　　　　　Dated July 13, 1971

Inventor(s) Paul D. Brohaugh

It is certified that error appears in the above-identified patent and that said Letters Patent are hereby corrected as shown below:

Column 3, line 42, cancel "shown" and substitute --shows--

Column 4, line 62, cancel "capable" and substitute --the--

Column 6, line 47, cancel "150°" and substitute --to--

Signed and sealed this 18th day of January 1972.

(SEAL)
Attest:

EDWARD M. FLETCHER, JR.　　　　ROBERT GOTTSCHALK
Attesting Officer　　　　　　　　Acting Commissioner of Patents